United States Patent [19]

Fisher

[11] Patent Number: 5,230,946
[45] Date of Patent: Jul. 27, 1993

[54] CARBON-CARBON COMPOSITE MATERIALS

[75] Inventor: Ronald Fisher, Rugby, England
[73] Assignee: Dunlop Limited, United Kingdom
[21] Appl. No.: 417,484
[22] Filed: Oct. 5, 1989

[30] Foreign Application Priority Data

Oct. 8, 1988 [GB] United Kingdom ............ 8823692

[51] Int. Cl.$^5$ .................................... B32B 5/04
[52] U.S. Cl. .................. 428/212; 428/113; 428/114; 428/408; 428/698
[58] Field of Search ............ 428/408, 698, 114, 113, 428/212

[56] References Cited

U.S. PATENT DOCUMENTS

| | | | |
|---|---|---|---|
| 4,256,801 | 3/1981 | Chuluda | 428/408 |
| 4,472,476 | 9/1984 | Veltri et al. | 428/408 |
| 4,476,178 | 10/1984 | Veltri et al. | 428/408 |
| 4,500,602 | 2/1985 | Patten et al. | 428/408 |
| 4,590,106 | 6/1986 | Tanaka et al. | 106/1.12 |
| 4,618,529 | 10/1986 | Yamamura et al. | 428/408 |
| 4,671,997 | 6/1987 | Galasso et al. | 428/698 |
| 4,770,926 | 9/1988 | Yamamura et al. | 428/408 |
| 4,776,935 | 9/1988 | Yamamura et al. | 428/408 |

FOREIGN PATENT DOCUMENTS

| | | |
|---|---|---|
| 1105826 | 3/1968 | United Kingdom . |
| 1260189 | 1/1972 | United Kingdom . |
| 1544994 | 4/1977 | United Kingdom . |
| 1509496 | 5/1978 | United Kingdom . |
| 2042010 | 9/1980 | United Kingdom . |
| 2161151 | 1/1986 | United Kingdom . |

OTHER PUBLICATIONS

Patent Abstracts of Japan, vol. 13, No. 380 (M-863) 23 Aug. 1989 & JP-A-11 33 720 (Nissan Motor Co. Ltd.) 25 May 1989.
American Ceramic Society Bulletin, vol. 67, No. 2, Feb. 1988, pp. 369-374, James R. Strife and James E. Sheenan 'Ceramic Coatings for Carbon–Carbon Composites' p. 370; FIGS. 3-3 and p. 371.
Chemical Abstracts, vol. 106, No. 2, 12 Jan. 1986, Columbus, Ohio, US; abstract No. 8725t, Tanaka Junichi and Al. 'Friction Parts', p. 230; Col. D; & JP-A-61 038 231 (Nippon Carbide Ind. Co.), 28 Aug. 1986.

Primary Examiner—Ellis P. Robinson
Assistant Examiner—A. A. Turner
Attorney, Agent, or Firm—Stevens, Davis, Miller & Mosher

[57] ABSTRACT

A coated carbon-carbon composite of the kind incorporating carbon fibres in a carbon matrix also incorporates in at least a region (2) thereof other fibres of a different axial coefficient of thermal expansion from that of the carbon fibres, the other fibres being arranged in relation to adjacent carbon fibres so as to provide in combination with the carbon matrix a coefficient of thermal expansion of that region (2) of the composite which is compatible with that of an anti-oxidation coating (1) on the surface of that region.

7 Claims, 1 Drawing Sheet

CARBON-CARBON COMPOSITE MATERIALS

BACKGROUND OF THE INVENTION

Carbon-carbon composites are members of a family of materials which consist of carbon fibres in a carbon matrix. These materials have desirable properties, particularly at high temperatures. For example the strength is not only retained at temperatures up to 2000° C. but actually increases compared to its value at room temperature. However, in oxidizing atmospheres at temperatures above 500° C. the materials oxidize, thereby rapidly losing mass and strength.

Previous attempts have been made to prevent oxidation by various means such as additives and coatings, with varying degrees of success. A known coating system employs an impervious refractory material such as silicon carbide or silicon nitride. One problem with such a material is that its coefficient of thermal expansion is much higher than the coefficient of thermal expansion of carbon-carbon composite in the axial direction of the carbon fibres. Consequently coatings of the refractories tend to crack or spall as the result of differential expansion or contraction of the composite and its coating when the composite is subjected to temperature changes. This problem exists in composites of many kinds including those in which the fibres are randomly arranged, but is of particular concern where the fibres are arranged substantially aligned to lie in a common plane, and more so when they are aligned to lie substantially all in a common direction.

FIELD OF THE INVENTION

One object of the present invention is to provide a coated carbon-carbon composite which has a reduced tendency for the coating to crack or spall as a result of temperature changes. Another object is to provide a coated carbon-carbon composite having a desired coefficient of expansion, at least in a given region thereof.

SUMMARY OF THE INVENTION

According to the present invention, a coated carbon-carbon composite incorporates carbon fibres in a carbon matrix and also incorporates in at least a region thereof other fibres of a different axial coefficient of thermal expansion from that of the carbon fibres, said other fibres being arranged in relation to adjacent carbon fibres so as to provide in combination with the carbon matrix a required coefficient of thermal expansion of the said region of the composite and said region of the composite being coated with an anti-oxidation coating.

To overcome the problems encountered with the prior art anti-oxidation coatings mentioned above, the present invention may provide in a carbon-carbon composite an interface layer of intermediate region comprising other fibres embedded in the carbon matrix and said other fibres being of a material preferably having a higher coefficient of thermal expansion than that of the carbon fibres, with the result that the interface layer or intermediate region has a higher coefficient of expansion than that of the remaining portions of the carbon-carbon composite. Optionally the interface layer or intermediate region may also incorporate carbon fibres. The coefficient of thermal expansion of the interface layer may be arranged to be intermediate that of a core region of the carbon fibre-reinforced composite and that of the anti-oxidation coating. If the carbon fibres at a surface region of the carbon-carbon composite material underlying the interface layer have a preferential orientation to lie substantially aligned in a common plane or direction, preferably said other fibres and any carbon fibres of the interface layer are each correspondingly substantially aligned.

Alternatively, the fibres of higher coefficient of thermal expansion material may be incorporated throughout the carbon matrix, so that a mixture of carbon fibres and other fibres provides the whole composite with a coefficient of thermal expansion which is different from that of a similar composite containing only carbon fibres. In this case, if the carbon fibres have a preferential orientation to lie substantially aligned in a common plane or direction, preferably said other fibres are correspondingly substantially aligned.

In either of the above examples, normal processes for deposition and densification e g Chemical Vapour Deposition ("CVD") may be used to provide the carbon matrix around the carbon and other fibre reinforcements.

One application of the invention relates to the provision of an anti-oxidation coating on exposed peripheral drive areas of the carbon discs of a multi-disc aircraft disc brake. In this application the carbon discs, or at least those portions or surface areas of the discs which are subject to oxidation may be arranged, in accordance with the invention, to have a higher coefficient of thermal expansion than that of a normal carbon-carbon composite, and the anti-oxidation coating is applied to these portions or surface areas.

It is also possible that for some applications a lower coefficient of thermal expansion may be desirable, and in such applications fibres of materials having a lower coefficient of thermal expansion may be employed in conjunction with the carbon fibres.

The means of incorporating carbon and other fibres in a fabric may be by well known techniques used in textile technology.

DETAILED DESCRIPTION OF THE INVENTION

Figure 1:
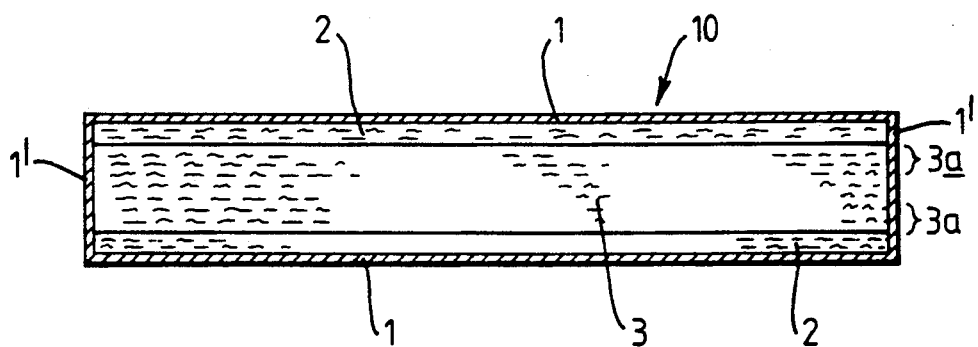
FIG. 1 is a sectional elevational view of a block of coated carbon-carbon composite according to the invention.
Figure 2:
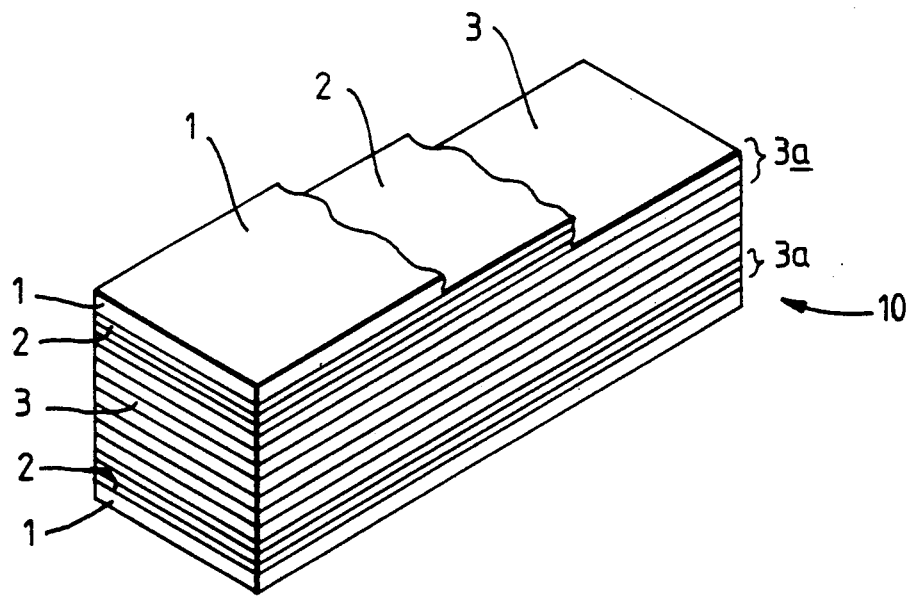
FIG. 2 is a part cut away perspective view of the block shown in FIG. 1.

In one example in accordance with the invention, a coated carbon-carbon composite element 10, shown in section in FIG. 1 and part cut away in perspective in FIG. 2, includes interface layers 2 between the main upper and lower faces of a conventional carbon-carbon composite core 3 and an anti-oxidation coating 1 on the exposed main surfaces of the interface layer 2. Outer regions 3a of the core have the carbon fibres thereof predominantly arranged to extend in the plane of FIG. 1 in a side-to-side direction as illustrated and the fibres of the adjacent interface layers 2 are correspondingly aligned.

The interface layers, which are built in to the element during its manufacture (by the CVD process) comprises a fabric made from "Nicalon", this being a trade name for silicon carbide continuous fibre produced by Nippon Carbon Co Ltd. The manufacturers quote a coefficient of thermal expansion of $3.1 \times 10^{-6}/°C.$ for this material, while normal carbon-carbon composites in the axial direction of the fibres have a coefficient of expansion of $-1$ to $+1 \times 10^{-6}/°C$.

A coating layer 1 of silicon carbide applied over the interface layers has a coefficient of thermal expansion of approximately $5 \times 10^{-6}/°C$. It can be seen that in this example a layer of silicon carbide fibres in a carbon matrix will have an expansion coefficient intermediate between those of the coating and the carbon-carbon composite core.

The coating layer additionally comprises edge portions 1' at edge regions of the core and interface layers.

It would be possible to achieve the desired coefficient of expansion by making a composite in which a carbon matrix is reinforced solely with e g silicon carbide fibres. However, carbon fibres are considerably cheaper than silicon carbide fibres and also the strength properties of silicon carbide fall off at 1000° C. while carbon fibres retain their strength up to 2000° C. The invention thus provides a relatively inexpensive and effective solution to the problem of cracking and spalling of anti-oxidation coatings.

The invention is particularly suitable for constructing the carbon discs of aircraft brakes; the coating may be provided on the exposed drive areas to protect those areas from oxidation.

What I claim is:

1. A coated carbon-carbon composite comprising a core of carbon fibres in a carbon matrix, an anti-oxidation coating and between said core and coating an intermediate region of the coated composite which incorporates other fibres of a different axial coefficient of thermal expansion from that of the carbon fibres, said other fibres being arranged in relation to adjacent carbon fibres so as to provide in combination with the carbon matrix a coefficient of thermal expansion intermediate that of the core region and that of the anti-oxidation coating.

2. A coated carbon-carbon composite according to claim 1 wherein the axial coefficient of expansion of said other fibres is greater than that of the carbon fibres.

3. A coated carbon-carbon composite according to claim 1 wherein said other fibres are provided in an interface layer comprising the said other fibres embedded in a carbon matrix.

4. A coated carbon-carbon composite according to claim 1 wherein the said other fibres are of silicon carbide.

5. A coated carbon-carbon composite according to claim 1 wherein said other fibres are substantially aligned to lie in a common plane or direction.

6. A coated carbon-carbon composite according to claim 5 wherein said plane or direction of alignment of said other fibres is substantially parallel with the plane or direction of alignment of carbon fibres of the composite.

7. An aircraft brake disc incorporating a coated carbon-carbon composite according to claim 1.

* * * * *